United States Patent
Bharadwaj et al.

(10) Patent No.: US 12,488,010 B2
(45) Date of Patent: Dec. 2, 2025

(54) ARTIFICIAL INTELLIGENCE DEVICE FOR ENTITY LINKING AND KNOWLEDGE BASE QUESTION AND ANSWERING AND CONTROL METHOD THEREOF

(71) Applicant: LG ELECTRONICS INC., Seoul (KR)

(72) Inventors: Manasa Bharadwaj, Toronto (CA); Yipeng Ji, Toronto (CA); Yolanda Liu, Toronto (CA); Borislav Mavrin, Alberta (CA); Touqir Sajed, Toronto (CA); Ali Pesaranghader, Toronto (CA)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/393,313

(22) Filed: Dec. 21, 2023

(65) Prior Publication Data

US 2024/0211482 A1   Jun. 27, 2024

Related U.S. Application Data

(60) Provisional application No. 63/434,502, filed on Dec. 22, 2022.

(51) Int. Cl.
   *G06F 16/20*      (2019.01)
   *G06F 16/2457*    (2019.01)
   *G06F 16/248*     (2019.01)

(52) U.S. Cl.
   CPC ...... *G06F 16/24578* (2019.01); *G06F 16/248* (2019.01)

(58) Field of Classification Search
   CPC .......... G06F 16/24578; G06F 16/248
   See application file for complete search history.

(56) References Cited

U.S. PATENT DOCUMENTS

| | | | |
|---|---|---|---|
| 5,933,822 A | 8/1999 | Braden-Harder et al. | |
| 6,263,335 B1 * | 7/2001 | Paik | G06F 16/367 707/999.005 |

(Continued)

FOREIGN PATENT DOCUMENTS

| | | | |
|---|---|---|---|
| CN | 113626613 A | 11/2021 | |
| EP | 3855320 A1 * | 7/2021 | |

(Continued)

*Primary Examiner* — Daniel A Kuddus
(74) *Attorney, Agent, or Firm* — Birch, Stewart, Kolasch & Birch, LLP

(57) ABSTRACT

A method for controlling an artificial intelligence (AI) device can include obtaining, via a processor in the AI device, a knowledge base including a plurality of nodes, and flattening, via the processor, the knowledge base by transforming the knowledge base into a first plurality of documents, each of the first plurality of documents identifying a node within the knowledge base. Also, the method can further include receiving, via the processor, a user query, performing, via the processor, matching based on the user query and the first plurality of documents to generate a ranked results list, reducing, via the processor, the ranked results list based on a reducing operation to generate a reduced list, and outputting, via the processor, linked entities based on the reduced list.

20 Claims, 6 Drawing Sheets

(56) References Cited

U.S. PATENT DOCUMENTS

| | | | |
|---|---|---|---|
| 8,332,394 B2* | 12/2012 | Fan | G06N 5/02 |
| | | | 707/723 |
| 9,542,854 B2* | 1/2017 | Anand | G06N 20/00 |
| 10,909,180 B2* | 2/2021 | Freed | G06F 16/93 |
| 10,949,613 B2* | 3/2021 | Freed | G06N 5/022 |
| 11,003,864 B2* | 5/2021 | Wang | G06N 3/08 |
| 11,227,127 B2* | 1/2022 | Kumar | G06F 40/30 |
| 11,469,238 B2* | 10/2022 | Fung | H10D 84/853 |
| 11,481,417 B2* | 10/2022 | Tiwari | G06F 16/3344 |
| 11,907,299 B2* | 2/2024 | Gwozdz | G06F 40/216 |
| 2016/0098398 A1* | 4/2016 | Bufe | G06F 16/93 |
| | | | 707/741 |
| 2016/0163215 A1* | 6/2016 | Anand | G09B 7/06 |
| | | | 434/353 |
| 2017/0140059 A1* | 5/2017 | Li | G06F 16/3346 |
| 2018/0246883 A1* | 8/2018 | Wang | G06F 17/18 |
| 2020/0279001 A1* | 9/2020 | Prabhugaonkar | G06N 5/022 |
| 2024/0126795 A1* | 4/2024 | Zhong | H04L 51/02 |

FOREIGN PATENT DOCUMENTS

| | | | |
|---|---|---|---|
| JP | 4738523 B2 | 5/2011 | |
| WO | WO2021109690 | * | 6/2021 |

* cited by examiner

ARTIFICIAL INTELLIGENCE DEVICE FOR ENTITY LINKING AND KNOWLEDGE BASE QUESTION AND ANSWERING AND CONTROL METHOD THEREOF

CROSS-REFERENCE TO RELATED APPLICATIONS

This non-provisional application claims priority under 35 U.S.C. § 119(e) to U.S. Provisional Application No. 63/434,502, filed on Dec. 22, 2022, the entirety of which is hereby expressly incorporated by reference into the present application.

BACKGROUND

Field

The present disclosure relates to a device and method for entity linking and knowledge base question and answering (KBQA), in the field of artificial intelligence (AI). Particularly, the method can provide detecting topic entities mentioned in a question and linking the topic entities to the correct knowledge base identifiers for knowledge base question and answering, in the AI field.

Discussion of the Related Art

Knowledge base question and answering (KBQA) systems and applications have gained significant traction in recent years, driven by the growing need to access and synthesize relevant knowledge efficiently. While traditional search engines excel at finding documents, they often struggle to provide accurate and concise answers to specific questions, leaving users wading through mountains of potentially irrelevant information.

Knowledge base question and answering (KBQA) systems and applications present a paradigm shift in the way people interact with knowledge and information. A KBQA system aims to analyze a user's query to identify key entities, relationships and the type of information being sought, searches a knowledge base based on the understanding of the query (e.g., exploring connections between entities and relationships relevant to the question), and generates an answer based on selecting the most relevant information from the knowledge base and packaging it into a coherent and informative answer for the user.

While KBQA systems hold immense potential, they still face several challenges that hinder their performance. For example, they face issues regarding language understanding and ambiguity, transparency and low explainability, and sometimes hallucinate information that does not exist.

In addition, KBQA systems often rely on multiple large language models (LLMs) for entity linking which increases the latency of the process and reduces overall throughput. For example, natural language processing for the input query often involves computationally expensive training and retraining, which can slow performance. Also, entity linking presents challenges regarding ambiguity (e.g., multiple candidates and name variations that can lead to confusion), scalability (e.g., linking in large KBs needs efficient algorithms), and explainability (e.g., understanding how choices are made can be difficult, such as a block box effect).

Accordingly, there is a need for improved entity linking and enhanced KBQA, which can answer questions faster, increase throughput, avoid hallucinations, and quickly and accurately perform entity linking.

SUMMARY OF THE DISCLOSURE

The present disclosure has been made in view of the above problems and it is an object of the present disclosure to provide a device and method that can provide entity linking and knowledge base question and answering (KBQA), in the field of artificial intelligence (AI). Further, the method can provide for detecting topic entities mentioned in a question and linking the topic entities to the correct knowledge base identifies for knowledge base question and answering, in the AI field.

An object of the present disclosure is to provide a method for controlling an artificial intelligence (AI) device that includes obtaining a knowledge base (KB) containing a plurality of nodes, flattening the KB by converting it into simplified documents, generating a search index based on these simplified documents, receiving a user query and retrieving the top-K most relevant documents from the search index to produce a ranked results list, refining the ranked results list through entity grouping which includes reducing information and eliminating duplicates to generate a concise list of documents (e.g., each document contains a unique named entity and an associated maximum custom score), further organizing the concise list of documents through clustering which groups documents and their corresponding entities into distinct clusters based on similarities (e.g., score ranges), iteratively performing the clustering process on the concise list of documents for varying values of K clusters, performing a majority voting process to select clustered entities with the highest votes to identify chosen entities, the chosen entities are designated as linked entities and transmitted to a KBQA system along with their corresponding KB identifiers, and the KBQA system generates an answer to the user query based on the linked entities.

Another object of the present disclosure is to provide method for controlling an artificial intelligence (AI) device that includes obtaining, via a processor in the AI device, a knowledge base including a plurality of nodes, flattening, via the processor, the knowledge base by transforming the knowledge base into a first plurality of documents, each of the first plurality of documents identifying a node within the knowledge base, receiving, via the processor, a user query, performing, via the processor, matching based on the user query and the first plurality of documents to generate a ranked results list, reducing, via the processor, the ranked results list based on a reducing operation to generate a reduced list, and outputting, via the processor, linked entities based on the reduced list.

An object of the present disclosure is to provide a method in which each of the linked entities includes one or more of an entity name of a node within the knowledge base and a knowledge base identifier corresponding to the entity name.

Another object of the present disclosure is to provide a method in which each document among the first plurality of documents includes a tuple having an entity name of a node within the knowledge base, a name of an incoming link or an outgoing link associated with the node, and a custom score.

Yet another object of the present disclosure is to provide a method that further includes transmitting the linked entities and the user query to a knowledge base question and answer (KBQA) system for generating an answer based on the user query and the linked entities.

An object of the present disclosure is to provide a method in which each document among the first plurality of documents includes a tuple having an entity name of a node within the knowledge base, a name of an incoming link or an outgoing link associated with the node, and a custom score.

Another object of the present disclosure is to provide a method in which the reducing operation includes at least one of an entity grouping process, a clustering process and a voting process.

An object of the present disclosure is to provide a method that further includes performing the entity grouping process by removing incoming link information and outgoing link information from the first plurality of documents and removing at least one duplicate document associated with a same entity name from the first plurality of documents, selecting a maximum custom score associated with each entity name within the first plurality of documents, and generating a second plurality of documents based on the first plurality of documents, each document in the second plurality of documents including a unique entity name and a maximum custom score associated with the unique entity name.

Another object of the present disclosure is to provide a method that further includes performing the clustering process by grouping entities from the second plurality of documents into K clusters, K being a natural number greater than or equal to 2, selecting entities included in one cluster among the K clusters to determine selected entities, and outputting the selected entities.

An object of the present disclosure is to provide a method that further includes performing the voting process by iteratively repeating the clustering process n times for varying values of K, n being a natural number greater than or equal to 2, choosing entities among the selected entities based on majority voting for the varying values of K clusters to determined chosen entities, and outputting the chosen entities as the linked entities.

Yet another object of the present disclosure is to provide a method that further includes creating a search index based on the first plurality of documents; and generating the ranked results list based on the user query and the search index.

An object of the present disclosure is to provide a method in which the ranked results list is generated based on combined results from a matching algorithm and an exact match algorithm.

Another object of the present disclosure is to provide a method in which the knowledge base includes at least one directed acyclic graph.

An object of the present disclosure is to provide a method in which the linked entities are determined without using any large language model (LLM) or natural language processing (NPL).

An object of the present disclosure is to provide an artificial intelligence (AI) device for entity linking that includes a memory configured to store knowledge base information; and a controller configured to obtain a knowledge base including a plurality of nodes, flatten the knowledge base by transforming the knowledge base into a first plurality of documents, each of the first plurality of documents identifying a node within the knowledge base, receive a user query, perform matching based on the user query and the first plurality of documents to generate a ranked results list, reduce the ranked results list based on a reducing operation to generate a reduced list, and output linked entities based on the reduced list.

In addition to the objects of the present disclosure as mentioned above, additional objects and features of the present disclosure will be clearly understood by those skilled in the art from the following description of the present disclosure.

BRIEF DESCRIPTION OF THE DRAWINGS

The above and other objects, features, and advantages of the present disclosure will become more apparent to those of ordinary skill in the art by describing example embodiments thereof in detail with reference to the attached drawings, which are briefly described below.

DETAILED DESCRIPTION OF THE EMBODIMENTS

Figure 1:
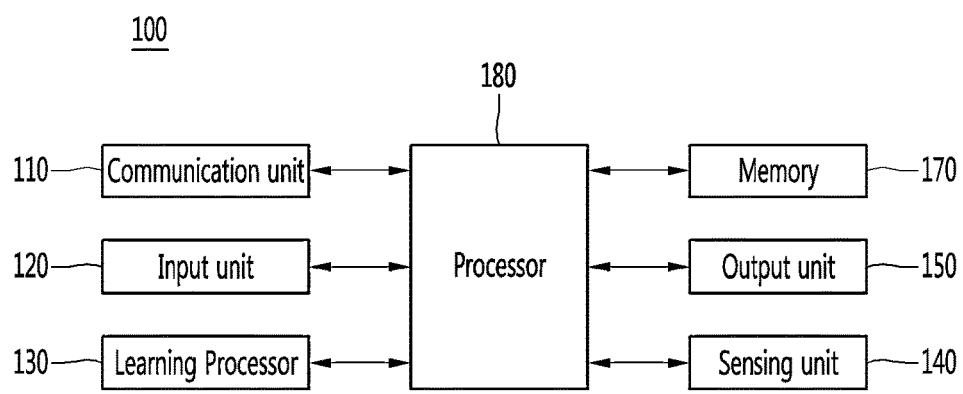
FIG. 1 illustrates an AI device according to an embodiment of the present disclosure.

Reference will now be made in detail to the embodiments of the present disclosure, examples of which are illustrated in the accompanying drawings.

Wherever possible, the same reference numbers will be used throughout the drawings to refer to the same or like parts.

Advantages and features of the present disclosure, and implementation methods thereof will be clarified through following embodiments described with reference to the accompanying drawings.

The present disclosure can, however, be embodied in different forms and should not be construed as limited to the embodiments set forth herein.

Rather, these embodiments are provided so that this disclosure will be thorough and complete, and will fully convey the scope of the present disclosure to those skilled in the art.

A shape, a size, a ratio, an angle, and a number disclosed in the drawings for describing embodiments of the present disclosure are merely an example, and thus, the present disclosure is not limited to the illustrated details.

Like reference numerals refer to like elements throughout. In the following description, when the detailed description of the relevant known function or configuration is determined to unnecessarily obscure the important point of the present disclosure, the detailed description will be omitted.

In a situation where "comprise," "have," and "include" described in the present specification are used, another part can be added unless "only" is used. The terms of a singular form can include plural forms unless referred to the contrary.

In construing an element, the element is construed as including an error range although there is no explicit description. In describing a position relationship, for example, when a position relation between two parts is described as "on," "over," "under," and "next," one or more other parts can be disposed between the two parts unless 'just' or 'direct' is used.

In describing a temporal relationship, for example, when the temporal order is described as "after," "subsequent," "next," and "before," a situation which is not continuous can be included, unless "just" or "direct" is used.

It will be understood that, although the terms "first," "second," etc. can be used herein to describe various elements, these elements should not be limited by these terms.

These terms are only used to distinguish one element from another. For example, a first element could be termed a second element, and, similarly, a second element could be termed a first element, without departing from the scope of the present disclosure.

Further, "X-axis direction," "Y-axis direction" and "Z-axis direction" should not be construed by a geometric relation only of a mutual vertical relation and can have broader directionality within the range that elements of the present disclosure can act functionally.

The term "at least one" should be understood as including any and all combinations of one or more of the associated listed items.

For example, the meaning of "at least one of a first item, a second item and a third item" denotes the combination of all items proposed from two or more of the first item, the second item and the third item as well as the first item, the second item or the third item.

Features of various embodiments of the present disclosure can be partially or overall coupled to or combined with each other and can be variously inter-operated with each other and driven technically as those skilled in the art can sufficiently understand. The embodiments of the present disclosure can be carried out independently from each other or can be carried out together in co-dependent relationship.

Hereinafter, the preferred embodiments of the present disclosure will be described in detail with reference to the accompanying drawings. All the components of each device or apparatus according to all embodiments of the present disclosure are operatively coupled and configured.

Artificial intelligence (AI) refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and can mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network can include an input layer, an output layer, and optionally one or more hidden layers. Each layer includes one or more neurons, and the artificial neural network can include a synapse that links neurons to neurons. In the artificial neural network, each neuron can output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network can be to determine the model parameters that minimize a loss function. The loss function can be used as an index to determine optimal model parameters in the learning process of the artificial neural network.

Machine learning can be classified into supervised learning, unsupervised learning, and reinforcement learning according to a learning method.

The supervised learning can refer to a method of learning an artificial neural network in a state in which a label for learning data is given, and the label can mean the correct answer (or result value) that the artificial neural network must infer when the learning data is input to the artificial neural network. The unsupervised learning can refer to a method of learning an artificial neural network in a state in which a label for learning data is not given. The reinforcement learning can refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving can include a technology for maintaining a lane while driving, a technology for automatically adjusting a speed, such as adaptive cruise control, a technique for automatically traveling along a predetermined route, and a technology for automatically setting and traveling a route when a destination is set.

The vehicle can include a vehicle having only an internal combustion engine, a hybrid vehicle having an internal combustion engine and an electric motor together, and an electric vehicle having only an electric motor, and can include not only an automobile but also a train, a motorcycle, and the like.

At this time, the self-driving vehicle can be regarded as a robot having a self-driving function.

FIG. 1 illustrates an artificial intelligence (AI) device 100 according to one embodiment.

The AI device 100 can be implemented by a stationary device or a mobile device, such as a television (TV), a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like. However, other variations are possible.

Referring to FIG. 1, the AI device 100 can include a communication unit 110 (e.g., transceiver), an input unit 120 (e.g., touchscreen, keyboard, mouse, microphone, etc.), a learning processor 130, a sensing unit 140 (e.g., one or more sensors or one or more cameras), an output unit 150 (e.g., a display or speaker), a memory 170, and a processor 180 (e.g., a controller).

The communication unit 110 (e.g., communication interface or transceiver) can transmit and receive data to and from external devices such as other AI devices 100a to 100e and the AI server 200 by using wire/wireless communication technology. For example, the communication unit 110 can transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), BLUETOOTH, RFID (Radio Frequency Identification), Infrared Data Association (IrDA), ZIGBEE, NFC (Near Field Communication), and the like.

The input unit 120 can acquire various kinds of data.

At this time, the input unit 120 can include a camera for inputting a video signal, a microphone for receiving an audio signal, and a user input unit for receiving information from a user. The camera or the microphone can be treated as a sensor, and the signal acquired from the camera or the microphone can be referred to as sensing data or sensor information.

The input unit 120 can acquire a learning data for model learning and an input data to be used when an output is acquired by using learning model. The input unit 120 can acquire raw input data. In this situation, the processor 180 or the learning processor 130 can extract an input feature by preprocessing the input data.

The learning processor 130 can learn a model composed of an artificial neural network by using learning data. The learned artificial neural network can be referred to as a learning model. The learning model can be used to an infer result value for new input data rather than learning data, and the inferred value can be used as a basis for determination to perform a certain operation.

At this time, the learning processor 130 can perform AI processing together with the learning processor 240 of the AI server 200.

At this time, the learning processor 130 can include a memory integrated or implemented in the AI device 100. Alternatively, the learning processor 130 can be implemented by using the memory 170, an external memory directly connected to the AI device 100, or a memory held in an external device.

The sensing unit 140 can acquire at least one of internal information about the AI device 100, ambient environment information about the AI device 100, and user information by using various sensors.

Examples of the sensors included in the sensing unit 140 can include a proximity sensor, an illuminance sensor, an acceleration sensor, a magnetic sensor, a gyro sensor, an inertial sensor, an RGB sensor, an IR (infrared) sensor, a fingerprint recognition sensor, an ultrasonic sensor, an optical sensor, a camera, a microphone, a lidar, and a radar.

The output unit 150 can generate an output related to a visual sense, an auditory sense, or a haptic sense.

At this time, the output unit 150 can include a display unit for outputting time information, a speaker for outputting auditory information, and a haptic module for outputting haptic information.

The memory 170 can store data that supports various functions of the AI device 100. For example, the memory 170 can store input data acquired by the input unit 120, learning data, a learning model, a learning history, and the like.

The processor 180 can determine at least one executable operation of the AI device 100 based on information determined or generated by using a data analysis algorithm or a machine learning algorithm. The processor 180 can control the components of the AI device 100 to execute the determined operation. For example, the processor 180 can execute a recommender or a recommendation system. The recommender can recommend an item to a user or an action to pursue from available options or actions.

To this end, the processor 180 can request, search, receive, or utilize data of the learning processor 130 or the memory 170. The processor 180 can control the components of the AI device 100 to execute the predicted operation or the operation determined to be desirable among the at least one executable operation.

When the connection of an external device is required to perform the determined operation, the processor 180 can generate a control signal for controlling the external device and can transmit the generated control signal to the external device.

The processor 180 can acquire information for the user input and can determine a recommended item or action based on the acquired intention information.

The processor 180 can acquire the information corresponding to the user input by using at least one of a speech to text (STT) engine for converting speech input into a text string or a natural language processing (NLP) engine for acquiring intention information of a natural language.

At least one of the STT engine or the NLP engine can be configured as an artificial neural network, at least part of which is learned according to the machine learning algorithm. At least one of the STT engine or the NLP engine can be learned by the learning processor 130, can be learned by the learning processor 240 of the AI server 200 (see FIG. 2), or can be learned by their distributed processing.

The processor 180 can collect history information including user profile information, the operation contents of the AI apparatus 100 or the user's feedback on the operation and can store the collected history information in the memory 170 or the learning processor 130 or transmit the collected history information to the external device such as the AI server 200. The collected history information can be used to update the learning model.

The processor 180 can control at least part of the components of AI device 100 to drive an application program stored in memory 170. Furthermore, the processor 180 can operate two or more of the components included in the AI device 100 in combination to drive the application program.

Figure 2:
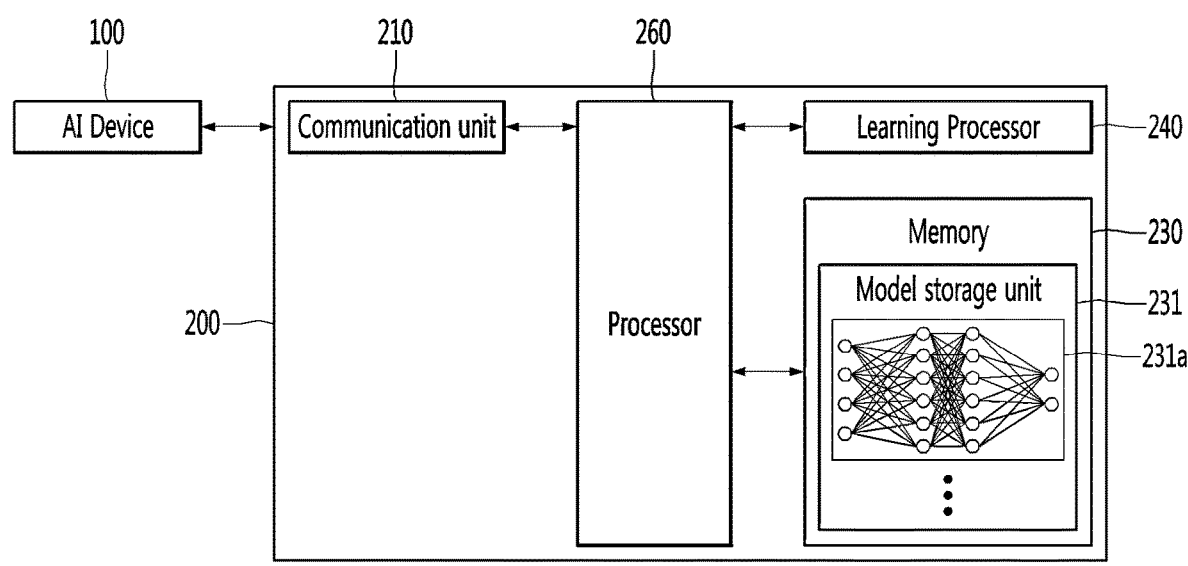
FIG. 2 illustrates an AI server according to an embodiment of the present disclosure.

FIG. 2 illustrates an AI server connected to an AI device 100 according to one embodiment.

Referring to FIG. 2, the AI server 200 can refer to a device that learns an artificial neural network by using a machine learning algorithm or uses a learned artificial neural network. The AI server 200 can include a plurality of servers to perform distributed processing, or can be defined as a 5G network, 6G network or other communications network. At this time, the AI server 200 can be included as a partial configuration of the AI device 100, and can perform at least part of the AI processing together.

The AI server 200 can include a communication unit 210, a memory 230, a learning processor 240, a processor 260, and the like.

The communication unit 210 can transmit and receive data to and from an external device such as the AI device 100.

The memory 230 can include a model storage unit 231. The model storage unit 231 can store a learning or learned model (or an artificial neural network 231a) through the learning processor 240.

The learning processor 240 can learn the artificial neural network 231a by using the learning data. The learning model can be used in a state of being mounted on the AI server 200 of the artificial neural network, or can be used in a state of being mounted on an external device such as the AI device 100.

The learning model can be implemented in hardware, software, or a combination of hardware and software. If all or part of the learning models are implemented in software, one or more instructions that constitute the learning model can be stored in memory 230.

The processor 260 can infer the result value for new input data by using the learning model and can generate a response or a control command based on the inferred result value.

Figure 3:
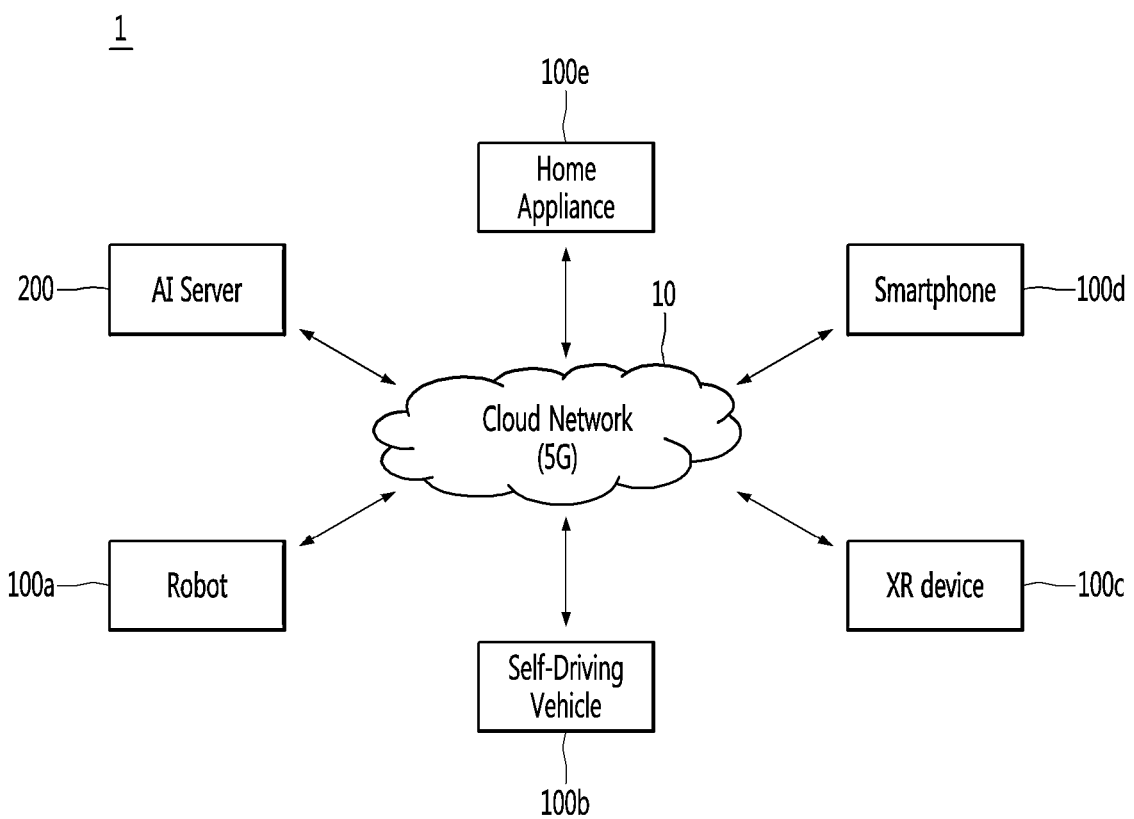
FIG. 3 illustrates an AI device according to an embodiment of the present disclosure.

FIG. 3 illustrates an AI system 1 including a terminal device according to one embodiment.

Referring to FIG. 3, in the AI system 1, at least one of an AI server 200, a robot 100a, a self-driving vehicle 100b, an XR (extended reality) device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, can be referred to as AI devices 100a to 100e. The AI server 200 of FIG. 3 can have the configuration of the AI server 200 of FIG. 2.

According to an embodiment, an entity linker and KBQA system can be implemented as an application or program that can be downloaded or installed in the smartphone 100d, which can communicate with the AI server 200, but embodiments are not limited thereto.

The cloud network 10 can refer to a network that forms part of a cloud computing infrastructure or exists in a cloud computing infrastructure. The cloud network 10 can be configured by using a 3G network, a 4G or LTE network, a 5G network, a 6G network, or other network.

For instance, the devices 100a to 100e and 200 configuring the AI system 1 can be connected to each other through the cloud network 10. In particular, each of the devices 100a to 100e and 200 can communicate with each other through a base station, but can directly communicate with each other without using a base station.

The AI server 200 can include a server that performs AI processing and a server that performs operations on big data.

The AI server 200 can be connected to at least one of the AI devices constituting the AI system 1, that is, the robot 100a, the self-driving vehicle 100b, the XR device 100c, the smartphone 100d, or the home appliance 100e through the cloud network 10, and can assist at least part of AI processing of the connected AI devices 100a to 100e.

At this time, the AI server 200 can learn the artificial neural network according to the machine learning algorithm instead of the AI devices 100a to 100e, and can directly store the learning model or transmit the learning model to the AI devices 100a to 100e.

At this time, the AI server 200 can receive input data from the AI devices 100a to 100e, can infer the result value for the received input data by using the learning model, can generate a response or a control command based on the inferred result value, and can transmit the response or the control command to the AI devices 100a to 100e. Each AI device 100a to 100e can have the configuration of the AI device 100 of FIGS. 1 and 2 or other suitable configurations.

Alternatively, the AI devices 100a to 100e can infer the result value for the input data by directly using the learning model, and can generate the response or the control command based on the inference result.

Hereinafter, various embodiments of the AI devices 100a to 100e to which the above-described technology is applied will be described. The AI devices 100a to 100e illustrated in FIG. 3 can be regarded as a specific embodiment of the AI device 100 illustrated in FIG. 1.

According to an embodiment, the home appliance 100e can be a smart television (TV), smart microwave, smart oven, smart refrigerator or other display device, which can implement an KBQA system with entity linking. The KBQA system or application can be the form of an executable application or program.

The robot 100a, to which the AI technology is applied, can be implemented as an entertainment robot, a guide robot, a carrying robot, a cleaning robot, a wearable robot, a pet robot, an unmanned flying robot, or the like.

The robot 100a can include a robot control module for controlling the operation, and the robot control module can refer to a software module or a chip implementing the software module by hardware.

The robot 100a can acquire state information about the robot 100a by using sensor information acquired from various kinds of sensors, can detect (recognize) surrounding environment and objects, can generate map data, can determine the route and the travel plan, can determine the response to user interaction, or can determine the operation.

The robot 100a can use the sensor information acquired from at least one sensor among the lidar, the radar, and the camera to determine the travel route and the travel plan.

The robot 100a can perform the above-described operations by using the learning model composed of at least one artificial neural network. For example, the robot 100a can recognize the surrounding environment and the objects by using the learning model, and can determine the operation by using the recognized surrounding information or object information. The learning model can be learned directly from the robot 100a or can be learned from an external device such as the AI server 200.

At this time, the robot 100a can perform the operation by generating the result by directly using the learning model, but the sensor information can be transmitted to the external device such as the AI server 200 and the generated result can be received to perform the operation.

The robot 100a can use at least one of the map data, the object information detected from the sensor information, or the object information acquired from the external apparatus to determine the travel route and the travel plan, and can control the driving unit such that the robot 100a travels along the determined travel route and travel plan. Further, the robot 100a can implement a KBQA system to respond to user queries.

The map data can include object identification information about various objects arranged in the space in which the robot 100a moves. For example, the map data can include object identification information about fixed objects such as walls and doors and movable objects such as pollen and desks. The object identification information can include a name, a type, a distance, and a position.

In addition, the robot 100a can perform the operation or travel by controlling the driving unit based on the control/interaction of the user. At this time, the robot 100a can acquire the intention information of the interaction due to the user's operation or speech utterance, and can determine the response based on the acquired intention information, and can perform the operation or generate an appropriate response.

The robot 100a, to which the AI technology and the self-driving technology are applied, can be implemented as a guide robot, a carrying robot, a cleaning robot (e.g., an automated vacuum cleaner), a wearable robot, an entertainment robot, a pet robot, an unmanned flying robot (e.g., a drone or quadcopter), or the like.

The robot 100a, to which the AI technology and the self-driving technology are applied, can refer to the robot itself having the self-driving function or the robot 100a interacting with the self-driving vehicle 100b.

The robot 100a having the self-driving function can collectively refer to a device that moves for itself along the given movement line without the user's control or moves for itself by determining the movement line by itself.

The robot 100a and the self-driving vehicle 100b having the self-driving function can use a common sensing method to determine at least one of the travel route or the travel plan. Also, the robot 100a can implement a KBQA system to respond to user queries or commands. For example, the robot 100a and the self-driving vehicle 100b having the self-driving function can determine at least one of the travel route or the travel plan by using the information sensed through the lidar, the radar, and the camera.

The robot 100a that interacts with the self-driving vehicle 100b exists separately from the self-driving vehicle 100b and can perform operations interworking with the self-driving function of the self-driving vehicle 100b or interworking with the user who rides on the self-driving vehicle 100b.

Also, according to an embodiment, the robot 100a can be a cleaning robot that can execute a KBQA system to respond to user queries and/or commands.

According to another embodiment, the robot 100a can be a food preparation robot or a chef robot configured to automatically prep ingredients and prepare and cook a meal or food dish based on the KBQA system.

In addition, the robot 100a interacting with the self-driving vehicle 100b can control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b can monitor the user boarding the self-driving vehicle 100b, or can control the function of the self-driving vehicle 100b through the interaction with the user. For example, when it is determined that the driver is in a drowsy state, the robot 100a can activate the self-driving function of the self-driving vehicle 100b or assist the control of the driving unit of the self-driving vehicle 100b. The function of the self-driving vehicle 100b controlled by the robot 100a can include not only the self-driving function but also the function provided by the navigation system or the audio system provided in the self-driving vehicle 100b.

Alternatively, the robot 100a that interacts with the self-driving vehicle 100b can provide information or assist the function to the self-driving vehicle 100b outside the self-driving vehicle 100b. For example, the robot 100a can provide answers to user's queries and traffic information including signal information and the like, such as a smart signal, to the self-driving vehicle 100b, and automatically connect an electric charger to a charging port by interacting with the self-driving vehicle 100b like an automatic electric charger of an electric vehicle.

Also, according to an embodiment, the self-driving vehicle 100b that can execute a KBQA system and perform entity linking to respond to user queries and commands.

According to an embodiment, the AI device 100 can implement a KBQA system or application that is configured to generate an answer in response to a user query or command.

According to another embodiment, the AI device 100 can be a KBQA system that is integrated into an infotainment system of the self-driving vehicle 100b, which can respond to user questions, but embodiments are not limited thereto. Also, the AI device 100 can be a KBQA system that is integrated into an infotainment system of the manual or human-driving vehicle.

Figure 4:
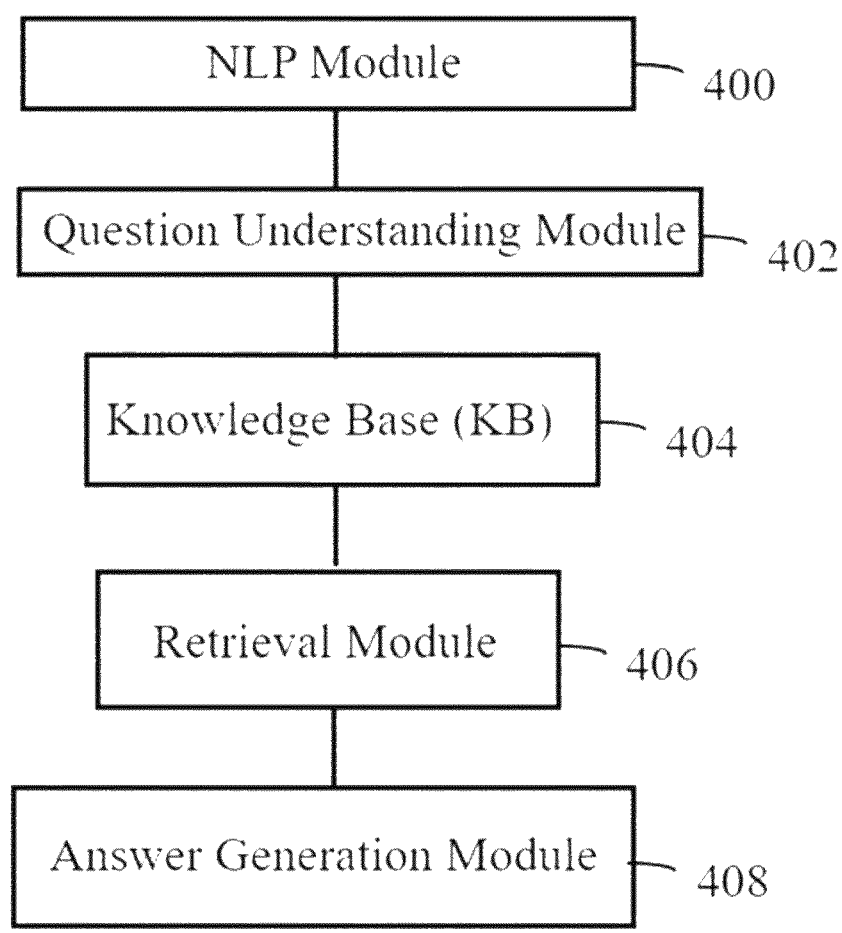
FIG. 4 illustrates an example overall configuration of the AI device configured with a Knowledge base question and answering (KBQA) system according to an embodiment of the present disclosure.

FIG. 4 shows an example overall configuration of the AI device 100 configured with a Knowledge base question and answering (KBQA) system according to an embodiment of the present disclosure. All the components of the KBQA system of the present disclosure are operatively coupled and configured.

Referring to FIG. 4, the AI device 100 can implement a KBQA system that has various components including a natural language processing (NLP) module 400, a question understanding module 402, a knowledge base (KB) 404, a retrieval module 406, and an answer generation module 408. Also, the parts of the KBQA system can be distributed among both of the AI device 100 and the AI server 200, but embodiments are not limited thereto. Alternatively, the entire KBQA system can be implemented within either of the AI device 100 or the AI server 200.

The natural language processing (NLP) module 400 can receive a user query and act as a language interpreter. The NLP module can perform tokenization and stemming to parse the user's query and identify key entities and relationships. Further, the NLP module can perform named entity recognition (NER) to identify entities, such as people, locations or organizations mentioned in the query and establish connections between pronouns and previously mentioned entities. However, embodiments are not limited thereto, and the NLP module can be replaced with a module that does not use any LLMs, as further detailed below.

For example, the NLP module 400 can use one or more large language modules (LLMs) to perform entity linking (e.g., BERT), in which topic entities mentioned in a question are detected and linked to the correct knowledge base identifiers. The NLP module can use a stack of transformer encoders and decoders that are pretrained on language tasks and can support fine tuning and reinforcement learning. Alternatively, the NLP module can use long short-term memory networks (LSTMs).

According to another embodiment, the NLP module 400 can be replaced by an entity linker module (e.g., an entity linker) that does not use any LLMs, discussed in more detail below, but embodiments are not limited thereto. Also, according to an embodiment, a hybrid approach can be provided in which results generated by the NLP module can be combined with results generated by entity linker module to create an aggregated list of knowledge base identifiers which can be provided to a deep learning based KBQA system for answering the user.

The question understanding module 402 can receive the processed query from the NLP module and analyze its structure and complexity. The question understanding module can determine the type of question being asked (e.g., factual, yes/no, comparative, etc.) and identifies the specific type of information the user is seeking, but embodiments are not limited thereto. For example, the question understanding module 402 can identify relationships between entities mentioned in the user's question and translate them into queries compatible with the knowledge base structure.

The knowledge base (KB) 404 is a repository that can contain a vast collection of interconnected facts and relationships about various entities. For example, the knowledge base 404 can be structured in different ways, e.g., triplets (e.g., subject-predicate-object), taxonomies, or ontologies. According to an embodiment, the KB can include triplets, in which each triplet can include a head, a relation and a tail. The knowledge base can support single hop paths or multiple hop paths, according to embodiments.

The knowledge base (KB) 404 can be a graph-based knowledge base (e.g., directed acyclic graphs DAGs) that can represent entities and relationships, and enable flexible connections and navigation, but embodiments are not limited thereto. For example, the KB can include Google Knowledge Graph and Freebase, etc.

The retrieval module 406 can bridge that gap between the interpreted query and the information stored in the knowledge base. For example, the retrieval module can translate the user's intent and entity mentions into queries compatible with the knowledge base structure, and perform a search within the knowledge base.

According to an embodiment, the retrieval module 406 can access specific entities, transverse relationship paths in the knowledge base, and/or employ reasoning techniques to gather relevant information.

The information gathered by the retrieval module 406 can be supplied to the answer generation module 408. The answer generation module can formulate a concise and informative response to the user query. For example, the answer generation module 408 can combine facts from different entities related to the query, summarize key points and filter out irrelevant information, and generate a natural language response that aligns with the type of the query and the user context, but embodiments are not limited thereto.

According to embodiments, elements of each of the natural language processing (NLP) module 400, the question understanding module 402, the knowledge base (KB) 404, the retrieval module 406, and the answer generation module 408 can be combined together into fewer modules, a single module and/or replaced with other types of modules. In addition, the natural language processing (NLP) module 400, the question understanding module 402, the knowledge base (KB) 404, the retrieval module 406, and the answer generation module 408 can be implemented as one or more controllers or by one or more processors, according to embodiments.

Aspects of the AI device 100 with respect to the entity linker are described in more detail below.

As discussed above, a Knowledge base question and answering (KBQA) system can rely on multiple large language modules (LLMs) for the task of entity linking (e.g., an NPL module, etc.). The task of entity linking involves detecting topic entities mentioned in the user question and linking them to the correct knowledge base identifiers. For example, this can be an initial step in the process of the KBQA. However, reliance on large language modules (LLMs) for the task of entity linking can present issues, such as increased latency, reduced overall throughput and can be computationally expensive. According to an embodiment, the use of multiple large language modules (LLMs) for the task of entity linking can be entirely replaced, as detailed below.

According to another embodiment, a hybrid approach can be provided in which results generated by the NLP module can be combined with results generated by entity linker module to create an aggregated list of knowledge base identifiers which can be provided to a KBQA system.

According to an embodiment, a method for controlling the AI device 100 can include obtaining, via a processor in the AI device 100, a knowledge base including a plurality of nodes, flattening, via the processor, the knowledge base by transforming the knowledge base into a first plurality of documents, each of the first plurality of documents identifying a node within the knowledge base, receiving, via the processor, a user query, performing, via the processor, matching based on the user query and the first plurality of documents to generate a ranked results list, reducing, via the processor, the ranked results list based on a reducing operation to generate a reduced list, and outputting, via the processor, linked entities based on the reduced list.

Figure 5:
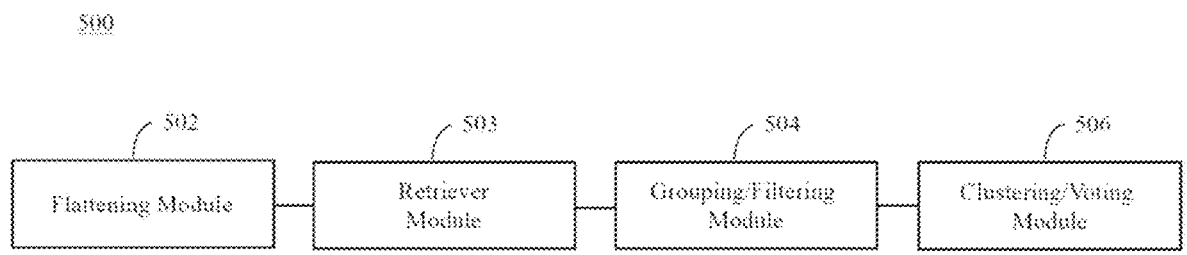
FIG. 5 shows an overview of components of an entity linker in the AI device, according to an embodiment of the present disclosure.

FIG. 5 shows an overview of components of an entity linker in the AI device, according to an embodiment of the present disclosure. According to an embodiment, the entity linking task or method can be carried out by an entity linker 500 that can include a flattening module 502, a retriever module 503, a grouping/filtering module 504 and a clustering/voting module 506, in which the AI device 100 can be configured with the entity linker. All the components of the entity linker 500 are operatively coupled and configured.

Also, the flattening module 502, retriever module 503, the grouping/filtering module 504 and the clustering/voting module 506 can be configured as the entity linker 500 in the AI device 100 and can be implemented as one or more controllers or by one or more processors, according to embodiments. In addition, the clustering/voting module 506 can be referred to as a clustering component.

A method for entity linking can include creating an index for entity searching and returning a results list based on a user query (e.g., the search index can include billions of documents), filtering/grouping entities based on the results list to generate top filtered entities, clustering entities from the top filtered entries to choose a set of entities to identify linked entities, and passing the linked entities with their corresponding knowledge base (KB) identifiers to a deep learning based KBQA system for answering the user.

According an embodiment, the entity linking can be agnostic with regards to the type of backend KBQA system used. For example, the linked entities and their corresponding knowledge base (KB) identifiers can be passed to any type of KBQA system for answering the user, according to embodiments.

The flattening module can flatten the knowledge base (KB) into a plurality of documents and can create a search index. For example, the flattening can include selecting a node within the knowledge base (KB) and extracting a name of the node, an incoming link of the node, an outgoing link of the node, and a KB identifier corresponding to the node. For example, the KB identifier can be a hexadecimal code. Also, when creating the plurality of documents for the search index, the other meta data associated with the node can be ignored, but embodiments are not limited thereto.

In other words, each document among the plurality of documents can include a tuple that lists the natural language (English) names of the chosen node and a name of at least one link associated with the node (e.g., incoming link or outgoing link). This document creation process can be repeated for every node within the knowledge base (KB) to generate the plurality of documents.

Figure 6:
FIG. 6 shows an example subgraph from a knowledge base, according to an embodiment of the present disclosure.

According to an embodiment, two documents can be created for each node within the knowledge base (KB), one document including a first tuple that includes the name of the node and the name of an incoming link associated with the node, and another document including a second tuple that includes the name of the node and the name of an outgoing link associated with the node, but embodiments are not limited thereto. For instance, the process can be applied to a knowledge base that includes multiple hop paths (e.g., three or more separate documents or tuples can be created for each node, etc.). FIG. 6 shows an example subgraph, which is discussed in more detailed below.

Figure 7:
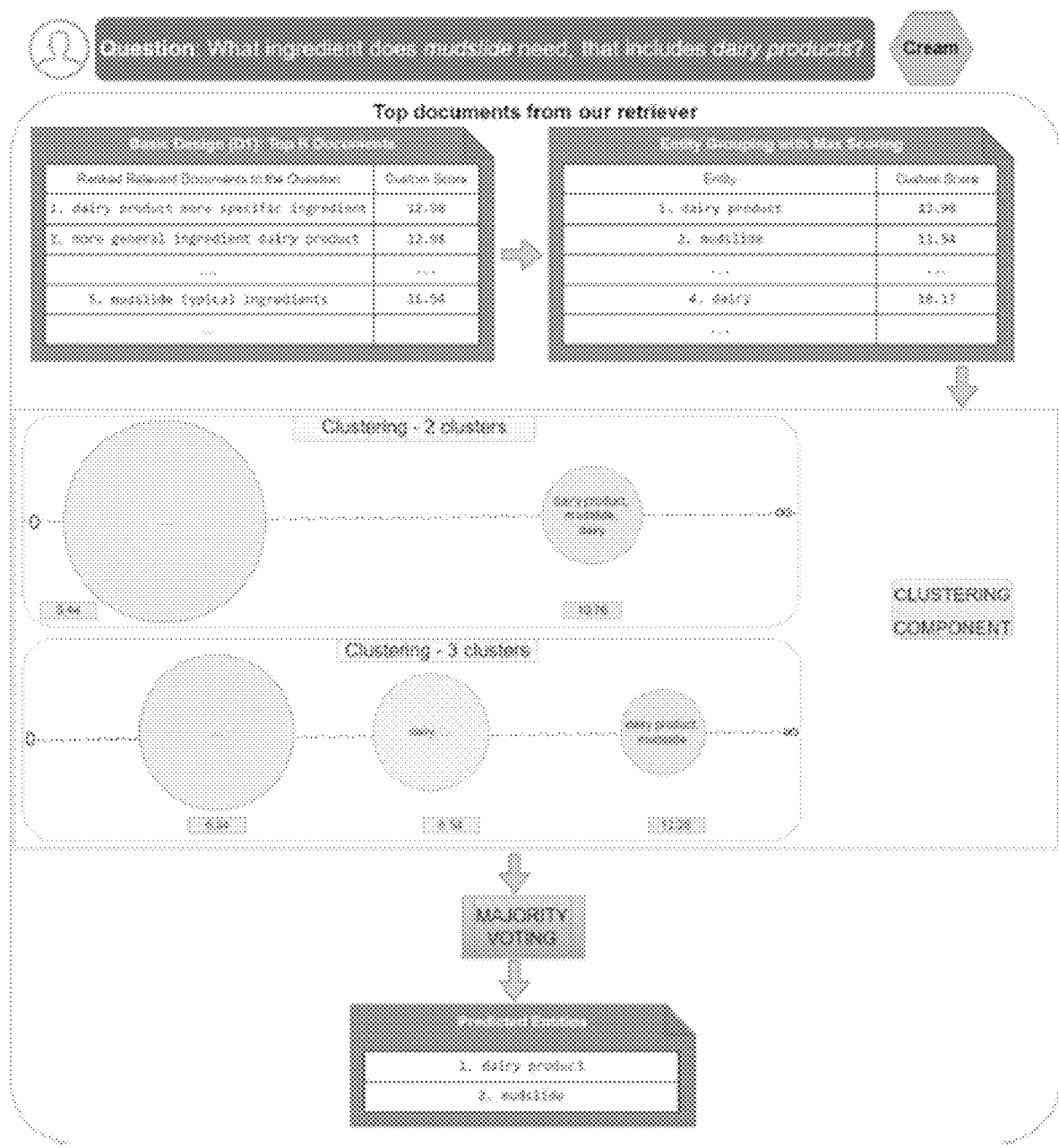
FIG. 7 shows an example querying pipeline for performing the entity linking, according to an embodiment of the present disclosure.

For example, with reference to FIG. 7, a querying pipeline is illustrated for performing the entity linking sub-task for a KBQA task. In this example, the knowledge base (KB) can include triplets (e.g., head, relation, tail), in which each triplet can represent a single hop path in the knowledge base (KB). Here, a food knowledge base is used as an example, but other types of knowledge base can be used.

With reference to FIG. 6, an example subgraph is show for the entity of "Pumkin pie" and it highlights eleven KB triplets. An example of a named triplet in FIG. 6 is (Pumpkin pie, typical ingredients, clove).

Further in this example, the flattening module can flatten the knowledge base (KB) by creating documents using tuples made from the triplets. For example, from a triplet (head, relation, tail), two documents can be created, such as a first document for (head, relation) portion of the triplet, e.g., (Pumkin pie, typical ingredients) and a second document for (relation, tail) portion of the triplet, e.g., (typical ingredients, clove).

According to an embodiment, the document can be created using concatenation of the tuple labels, in which this process can be repeated for all of the nodes within the knowledge base to create a plurality of documents. Then these documents can be pre-processed to be indexed for creating the search index using all of the tuple documents. The search index can be created based on pyserini or elastic search, but embodiments are not limited thereto.

According to an embodiment, the retriever module 503 can receive a user query as an input and a scoring algorithm can be used to retrieve the top K documents within the search index for the plurality of documents (e.g., top 10, 20 or 100 documents, etc.). Also, each of the top K documents can be provided or assigned a custom score for ranking.

For example, BM25 can be used to retrieve the best matching top K documents, which can be ranked based on several factors including term frequency (TF), document length (DL), inverse document frequency (IDF), and tunable parameters for controlling the impact of term frequency (TF) and inverse document frequency (IDF), but embodiments are not limited thereto. For example, various equations and variants can be used for scoring ranked results depending on design parameters and needs.

After generating the ranked results including the top K documents that match the user input query, the retriever module 503 can transmit the top K documents and corresponding custom scores to the grouping/filtering module. According to another embodiment, the top K documents can be set as entities, in which the entities and their corresponding knowledge base identifiers can be directly passed to the KBQA system for answering the user's query. However, if the entities and their corresponding knowledge base identifiers are directly passed to the KBQA system as linked entities from the flattening module, then this may result in too many linked entities for the KBQA system to be able to effectively handle which may reduce the performance of the KBQA system's ability to generate good answers.

In addition, after receiving the ranked results including the top K documents that best match with the user input query, the grouping/filtering module can create a new list of documents based on the top K documents, in which the new list of documents can include entity names and corresponding custom scores. In other words, as shown in FIG. 7, information other than the entity name and custom score can be removed to create a condensed document that includes the entity name and the custom score (e.g., a tuple document including "dairy product," "more specific ingredient," and "12.98" can be converted to "dairy product" and "12.98"). Also, each document can contain the corresponding knowledge base identifier (e.g., a hexadecimal code).

For example, each document within the new list can include an entity name and a corresponding custom score. Also, the previous list can include multiple documents for the same name entity but with different corresponding scores. This is possible because the same entity can be retrieved multiple times due to multiple links to that same entity.

In addition, the grouping/filtering module can include a max scoring component to further refine the list, in which the max score is selected from all available scores for each unique entity and the list is reduced so that duplicate entities are eliminated. In other words, if there are three documents with three different scores that all correspond to the same name entity, then the maximum score associated with the same name entity can be selected and the remaining documents for that same name entity can be removed or consolidated. In this way, the new list of documents can be reduced to a condensed list including a plurality of documents, in which one document is provided for each unique name entity with the corresponding maximum score. For example, each document in the condensed list of documents can include a unique name entity, a corresponding maximum score, and a corresponding KB identifier (e.g., a hexadecimal code).

According to an embodiment, the condensed list generated by the grouping/filtering module can passed to the knowledge base question and answering (KBQA) system for answering the user's query, but embodiments are not limited thereto. For example, the condensed list generated by the grouping/filtering module may still contain too many linked entities for the knowledge base question and answering system to handle in order to produce a useful answer to the user query. Also, if the condensed list generated by the grouping/filtering module is passed directly to the KBQA system, this can cause ambiguity issues when trying to generate an answer to the user query. Thus, according to an embodiment, the condensed list generated by the grouping/filtering module can be transmitted to the clustering/voting module (e.g., clustering component).

The clustering/voting module can receive the condensed list or a condensed group of documents including a plurality of documents (e.g., each document including a unique name entity and a maximum custom score corresponding to that unique name entity) and can predict the final linked entities based on clustering and a majority voting operation.

For example, the clustering/voting module can organize entities within the condensed list (condensed group of documents) into different clusters. Each distinct cluster can contain entities that are in a similar score range. Alternatively, entities can be grouped together in different cluster based on other similar traits or attributes.

According to an embodiment, various clustering algorithms can be used, such as K-Means clustering can be used to perform automatic clustering without human intervention. Also, the K number of cluster to use can be predetermined and set ahead of time.

In addition, leveraged K Means clustering can be used for a specified number of clusters that are to be created using the input data. For example, if K is set to 3, the clustering algorithm can automatically determine how to create 3 possible clusters from the input data. This approach is based on iteratively assigned each node to one of the 3 clusters and computing each of the node's distance from the center of the corresponding cluster. The process can converge until each node is assigned to a closed cluster center. Further, based on every iteration, the centers of the clusters can be updated.

In addition, the clustering/voting module can be extended to any number of features to support multi-dimensional clustering. Example features that can be used for multi-dimensional clustering can include semantic similarity scores (e.g., cosine similarity from language models, Euclidean distance), popularity score, etc., but embodiments are not limited thereto.

Also, the number of clusters can be determined according to a set hyperparameter, which can be tuned or adjusted. For example, the hyperparameter can be chosen using the Elbow method, but embodiments are not limited thereto (e.g., Gap statistic, Davies-Bouldin index, etc.). In FIG. 7, the clustering module (e.g., clustering component) shows two clustering examples for the number of clusters (K), e.g., 2 clusters and 3 clusters. However, the number of clusters (K) can be set differently according to embodiments.

In addition, the clustering/voting module (e.g., clustering component) can include a majority voting component that can be a type of ensemble technique. For example, there is a trade-off between precision and recall, in which using a higher number of clusters can increase precision metrics while using a lower number of clusters can improve recall. In other words, more clusters improve precision but harm recall, while fewer clusters do the opposite. In order to address these issues and achieve a high F1 score, the clustering/voting module can employ a majority voting technique for the entities in the top clusters across different K values for the number of clusters. For example, an F1 score is a metric used to evaluate the balance between precision and recall.

According to an embodiment, the majority voting technique can include creating a list by choosing the cluster with the maximum average custom score as the top cluster per clustering value K. For example, the clustering module with majority voting can include producing a distinct number of K clusters based on the condensed list (condensed group of documents) generated by the grouping/filtering module (e.g., documents each including a unique name entity and a max custom score) and repeating this process for different values of K. Then knowledge base (KB) identifiers for the most voted entities across different K value clusters are returned as linked entities. Further, these linked entities are transmitted to the KBQA system and the KBQA system generates an answer to the user query based on these linked entities.

For example, different clustering iterations can include three iterations for creating two clusters for the input data (e.g., K=2), creating three clusters for the input data (e.g., K=3), and creating four clusters for the input data (e.g., K=4). A cluster having the highest score can be selected from each of the three iterations, thus providing three different sized clusters with highest score.

In this example, the cluster with the highest score from each iteration can have a different number of KB entities and different KB entities. In other to combine insights from all these clusters, KB entities can combined from the best cluster with the highest score from each of the algorithms and chooses the ones which have been chosen by majority of the clustering outputs. For example, running clustering for K=2 can choose KB entities A, C and F, running clustering for K=3 can choose KB entities A and C, and running clustering for K=4 can choose KB entity C. In this example, KB entity A gets only 2 votes, KB entity C gets 3 votes, and KB entity F gets only 1 vote, thus, KB entity C can be chosen as the final output for the linked entity since it obtained the maximum number of votes.

In addition, the clustering/voting module transmits the linked entities and their corresponding knowledge base (KB) identifiers to a deep learning KBQA system for answering the user, which can be agnostic to the specific type of deep learning KBQA system that is used. In other words, the determined linked entities and their knowledge base (KB) identifiers can be sent to any type of KBQA system. In this way, the use of large language models (LLMs) can be avoided when performing the entity linking task, which can speed up processing and throughput (e.g., by as much as 14 times or more).

According to an embodiment, the AI device 100 implementing the entity linker for KBQA can perform a method including obtaining a large index of documents containing entities and relationships, and simplifying the documents further to make them easily searchable. Then, in response to a user query, the AI device 100 can search the list of simplified documents and generate a ranked list of the documents that best match the user query. Further in this method, the top documents are grouped together and divided into clusters based on how similar they are (e.g., based on scores, etc.), and the clusters vote for the most important entities related to the user query. Then the entities with the most votes (e.g., based on majority voting) and their corresponding KB identifiers are transmitted to a KBQA system for generating an answer to the user's query. For example, the KBQA system can use the chosen linked entities like steppingstones or short cuts, in order to more quickly craft the most accurate and informative answer to the user query.

According to an embodiment, the AI device 100 implementing the entity linker for KBQA can perform a method including obtaining a knowledge base including a plurality of nodes, flattening the knowledge base by transforming it into simpler documents that are more readily searchable and accessible, and generating a search index based on the simplified documents. Further in this method, the AI device 100 can receive a user query and retrieve the most relevant top-K documents from the search index to generate a ranked results list. Then, the ranked results list is refined with entity grouping which reduced information in the documents, eliminates duplicates and creates a condensed list of simplified documents, in which each simplified document includes a unique named entity and corresponding maximum custom score. Then, the condensed list of simplified documents is further categorized with clustering in which entities within the condensed list are grouped in distinct clusters based on similarities, and this clustering process is repeated for different values of K clusters. Then, a majority voting process can be carried out to choose the clustered entities that have the most votes, and these chosen entities are set as linked entities and transmitted to a KBQA system along with their corresponding KB identifiers for generating an answer to the user query.

According to another embodiment, a method for controlling the AI device 100 can include obtaining a knowledge base (KB) containing a plurality of nodes, flattening the KB by converting it into simplified documents, generating a search index based on these simplified documents, receiving a user query and retrieving the top-K most relevant documents from the search index to produce a ranked results list, refining the ranked results list through entity grouping which includes reducing information and eliminating duplicates to generate a concise list of documents (e.g., each document contains a unique named entity and an associated maximum custom score), further organizing the concise list of documents through clustering which groups documents and their corresponding entities into distinct clusters based on similarities (e.g., score ranges), iteratively performing the clustering process on the concise list of documents for varying values of K clusters, performing a majority voting process to select clustered entities with the highest votes to identify chosen entities, the chosen entities are designated as linked entities and transmitted to a KBQA system along with their corresponding KB identifiers, and the KBQA system generates an answer to the user query based on the linked entities.

According to one or more embodiments of the present disclosure, the AI device 100 implementing the entity linker for KBQA can solve one or more technological problems in the existing technology, such as providing improved performance, increased throughput, and more quickly and accurately performing entity linking. Also, the AI device 100 implementing the entity linker for KBQA can help avoid or prevent hallucinations, since reliance on large language models (LLMs) and natural language processing (NPL) modules can be reduced or avoided with regards to the entity linking task.

Various aspects of the embodiments described herein can be implemented in a computer-readable medium using, for example, software, hardware, or some combination thereof. For example, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions can be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

Furthermore, although some aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM.

Computer programs based on the written description and methods of this specification are within the skill of a software developer. The various programs or program modules can be created using a variety of programming techniques. For example, program sections or program modules can be designed in or by means of Java, C, C++, assembly language, Perl, PHP, HTML, or other programming languages. One or more of such software sections or modules can be integrated into a computer system, computer-readable media, or existing communications software.

Although the present disclosure has been described in detail with reference to the representative embodiments, it will be apparent that a person having ordinary skill in the art can carry out various deformations and modifications for the embodiments described as above within the scope without departing from the present disclosure. Therefore, the scope of the present disclosure should not be limited to the aforementioned embodiments, and should be determined by all deformations or modifications derived from the following claims and the equivalent thereof.

What is claimed is:

1. A computer-implemented method for controlling an artificial intelligence (AI) device, the method comprising:
   obtaining, via a processor in the AI device, a knowledge base including a plurality of nodes;
   flattening, via the processor, the knowledge base by transforming the knowledge base into a first plurality of documents, the first plurality of documents identifying nodes within the knowledge base;
   receiving, via the processor, a user query;
   performing, via the processor, matching based on the user query and the first plurality of documents to generate a ranked results list;
   reducing, via the processor, the ranked results list based on a reducing operation to generate a reduced list; and
   outputting, via the processor, linked entities based on the reduced list,
   wherein the transforming the knowledge base into the first plurality of documents includes:
      selecting a node within the knowledge base, extracting a name of the node and at least one of an incoming link of the node and an outgoing link of the node,
      creating, for the node, a separate document including the name of the node and at least one of the incoming link of the node and the outgoing link of the node, and
      adding the separate document to the first plurality of documents,
   wherein the knowledge base includes multiple hop-paths, and the knowledge base includes triplets in which each of the triplets represents a single hop path within the knowledge base.

2. The computer-implemented method of claim 1, wherein each of the linked entities includes one or more of an entity name of a node within the knowledge base and a knowledge base identifier corresponding to the entity name.

3. The computer-implemented method of claim 1, further comprising:
   transmitting the linked entities and the user query to a knowledge base question and answer (KBQA) system for generating an answer based on the user query and the linked entities.

4. The computer-implemented method of claim 1, wherein each document among the first plurality of documents includes a tuple having an entity name of a node within the knowledge base, a name of an incoming link or an outgoing link associated with the node.

5. The computer-implemented method of claim 1, wherein the reducing operation includes at least one of an entity grouping process, a clustering process and a voting process.

6. The computer-implemented method of claim 5, further comprising:
performing the entity grouping process including:
removing incoming link information or outgoing link information from the first plurality of documents and removing at least one duplicate document associated with a same entity name from the first plurality of documents;
selecting a maximum custom score associated with each entity name within the first plurality of documents; and
generating a second plurality of documents based on the first plurality of documents, each document in the second plurality of documents including a unique entity name and a maximum custom score associated with the unique entity name.

7. The computer-implemented method of claim 6, further comprising:
performing the clustering process including:
grouping entities from the second plurality of documents into K clusters, K being a natural number greater than or equal to 2;
selecting entities included in one cluster among the K clusters to determine selected entities; and
outputting the selected entities.

8. The computer-implemented method of claim 7, further comprising:
performing the voting process including:
iteratively repeating the clustering process n times for varying values of K, n being a natural number greater than or equal to 2;
choosing entities among the selected entities based on majority voting for the varying values of K clusters to determined chosen entities; and
outputting the chosen entities as the linked entities.

9. The computer-implemented method of claim 1, further comprising:
creating a search index based on the first plurality of documents; and
generating the ranked results list based on the user query and the search index.

10. The computer-implemented method of claim 1, wherein the ranked results list is generated based on combined results from a matching algorithm and an exact match algorithm.

11. The computer-implemented method of claim 1, wherein the knowledge base includes at least one directed acyclic graph.

12. The computer-implemented method of claim 1, wherein the linked entities are determined without using any large language model (LLM) or Deep learning.

13. A computer-implemented artificial intelligence (AI) device for entity linking, the AI device comprising:
a memory configured to store knowledge base information; and
a controller configured to:
obtain a knowledge base including a plurality of nodes, flatten the knowledge base by transforming the knowledge base into a first plurality of documents, the first plurality of documents identifying nodes within the knowledge base,
receive a user query,
perform matching based on the user query and the first plurality of documents to generate a ranked results list,
reduce the ranked results list based on a reducing operation to generate a reduced list, and
output linked entities based on the reduced list,
wherein the transforming the knowledge base into the first plurality of documents includes:
selecting a node within the knowledge base, extracting a name of the node and at least one of an incoming link of the node and an outgoing link of the node,
creating, for the node, a separate document including the name of the node and at least one of the incoming link of the node and the outgoing link of the node, and
adding the separate document to the first plurality of documents,
wherein the knowledge base includes multiple hop-paths, and the knowledge base includes triplets in which each of the triplets represents a single hop path within the knowledge base.

14. The computer-implemented AI device of claim 13, wherein each of the linked entities includes one or more of an entity name of a node within the knowledge base and a knowledge base identifier corresponding to the entity name.

15. The computer-implemented AI device of claim 13, wherein each document among the first plurality of documents includes a tuple having an entity name of a node within the knowledge base, a name of an incoming link or an outgoing link associated with the node.

16. The computer-implemented AI device of claim 13, wherein the reducing operation includes at least one of an entity grouping process, a clustering process and a voting process.

17. The computer-implemented AI device of claim 16, wherein the controller is further configured to:
perform the entity grouping process by:
removing incoming link information or outgoing link information from the first plurality of documents and removing at least one duplicate document associated with a same entity name from the first plurality of documents,
selecting a maximum custom score associated with each entity name within the first plurality of documents, and
generating a second plurality of documents based on the first plurality of documents, each document in the second plurality of documents including a unique entity name and a maximum custom score associated with the unique entity name.

18. The computer-implemented AI device of claim 17, wherein the controller is further configured to:
perform the clustering process by:
grouping entities from the second plurality of documents into K clusters, K being a natural number greater than or equal to 2,
selecting entities included in one cluster among the K clusters to determine selected entities, and
outputting the selected entities.

19. The computer-implemented AI device of claim 18, wherein the controller is further configured to:
perform the voting process by:

iteratively repeating the clustering process n times for varying values of K, n being a natural number greater than or equal to 2, choosing entities among the selected entities based on majority voting for the varying values of K clusters to determined chosen entities, and outputting the chosen entities as the linked entities.

20. The computer-implemented AI device of claim 13, wherein the linked entities are determined without using any large language model (LLM) or Deep learning.

* * * * *